United States Patent
Eichhorn et al.

(10) Patent No.: US 11,118,619 B2
(45) Date of Patent: Sep. 14, 2021

(54) CONNECTION ASSEMBLY

(71) Applicant: AUDI AG, Ingolstadt (DE)

(72) Inventors: Alexander Eichhorn, Eppingen (DE); Ralf Maisch, Abstatt (DE); Heiner Fees, Bietigheim-Bissingen (DE)

(73) Assignee: AUDI AG, Ingolstadt (DE)

( * ) Notice: Subject to any disclaimer, the term of this patent is extended or adjusted under 35 U.S.C. 154(b) by 248 days.

(21) Appl. No.: 16/076,435

(22) PCT Filed: Mar. 1, 2017

(86) PCT No.: PCT/EP2017/054774
§ 371 (c)(1),
(2) Date: Aug. 8, 2018

(87) PCT Pub. No.: WO2017/167531
PCT Pub. Date: Oct. 5, 2017

(65) Prior Publication Data
US 2019/0048920 A1 Feb. 14, 2019

(30) Foreign Application Priority Data
Mar. 29, 2016 (DE) .................... 10 2016 205 155.5

(51) Int. Cl.
| *F16B 41/00* | (2006.01) |
| *F16B 1/00* | (2006.01) |
| *H01M 50/502* | (2021.01) |

(52) U.S. Cl.
CPC .... *F16B 41/002* (2013.01); *F16B 2001/0064* (2013.01); *H01M 50/502* (2021.01)

(58) Field of Classification Search
CPC ............ F16B 41/002; F16B 2001/0064; F16B 19/02; F16B 4/004; F16B 35/04–048;
(Continued)

(56) References Cited

U.S. PATENT DOCUMENTS 2,831,520 A * 4/1958 Clarke .................. F16B 41/002
411/349
3,018,127 A * 1/1962 Dobrosielski ............ F16J 13/18
292/251
(Continued)

FOREIGN PATENT DOCUMENTS

| CN | 101451571 A | 6/2009 | |
| DE | 8701553 U1 * | 3/1987 | .............. F16B 12/30 |

(Continued)

OTHER PUBLICATIONS

Notification of Transmittal of Translation of the International Preliminary Report on Patentability dated Oct. 11, 2018, in connection with corresponding international Application No. PCT/EP2017/054774 (8 pgs.).

(Continued)

*Primary Examiner* — Victor D Batson
*Assistant Examiner* — Amit Singh Dhillon
(74) *Attorney, Agent, or Firm* — Maier & Maier, PLLC

(57) ABSTRACT

A connection assembly with at least one receiving module for receiving a securing element. The at least one receiving module has a chamber for receiving the respective securing element, the chamber being delimited by an inner wall, and has a first opening as well as a second opening. The two openings delimit a passage channel within the chamber, and the inner wall has at least one latching module to which the securing element is to be latched within the chamber at least temporarily after guiding the securing element along a longitudinal direction of the passage channel into the chamber through the first opening. The latched securing element is to be received completely within the chamber.

15 Claims, 2 Drawing Sheets

(58) Field of Classification Search
CPC ....... F16B 27/00; H01M 2/202; H01M 2/204; H01M 2/206; H01M 2/208; H01M 2/1038; H01M 50/502
USPC ......... 411/999, 508, 509, 510; 81/13, 52, 55
See application file for complete search history.

(56) References Cited

U.S. PATENT DOCUMENTS

| | | | | |
|---|---|---|---|---|
| 3,924,492 A * | 12/1975 | Bray | ..................... | B25B 13/483 81/124.6 |
| 5,094,579 A * | 3/1992 | Johnson | ................... | F02B 77/00 411/107 |
| 5,266,258 A * | 11/1993 | Martin | .................. | B29C 66/612 264/249 |
| 5,536,124 A * | 7/1996 | Silva | ..................... | F16B 33/004 411/85 |
| 5,725,396 A * | 3/1998 | Stocchiero | ............ | H01M 2/206 439/521 |
| 5,941,669 A * | 8/1999 | Aukzemas | ............. | F16B 41/002 411/107 |
| 6,464,438 B1 | 10/2002 | Dowling | | |
| 6,813,977 B2 * | 11/2004 | Goodhue | ................ | B25B 23/04 227/137 |
| 8,434,983 B2 * | 5/2013 | Chen | ..................... | F16B 5/0208 411/353 |
| 2002/0150443 A1 * | 10/2002 | Johnson | ................ | F16B 41/002 411/353 |
| 2007/0065323 A1 * | 3/2007 | Horiuchi | ............... | F16B 41/002 417/572 |
| 2009/0110478 A1 * | 4/2009 | Schneider | ............. | F16B 35/041 403/388 |
| 2009/0142158 A1 * | 6/2009 | Dai | ...................... | F16B 41/002 411/353 |
| 2009/0211408 A1 * | 8/2009 | Peng | ..................... | B25B 13/483 81/125 |
| 2010/0068002 A1 * | 3/2010 | Crutchley | ............. | F16B 35/048 411/177 |
| 2010/0260578 A1 * | 10/2010 | Ullein | ................... | F16B 41/002 411/360 |
| 2015/0167709 A1 * | 6/2015 | Buchta | .................... | F16B 19/02 411/546 |

FOREIGN PATENT DOCUMENTS

| | | | | |
|---|---|---|---|---|
| DE | 8701553 U1 | 3/1987 | | |
| DE | 202007014325 U1 | 12/2007 | | |
| EP | 1881211 A2 | 1/2008 | | |
| EP | 2048384 A2 * | 4/2009 | ........... | F16B 41/002 |
| WO | 2015140916 A1 | 9/2015 | | |
| WO | WO-2015140916 A1 * | 9/2015 | ........... | F16B 5/0275 |

OTHER PUBLICATIONS

German Office Action dated Sep. 10, 2019, in connection with corresponding DE Application No. 10 2016 205 155.5 (14 pgs., including machine-generated English translation).

International Search Report and Written Opinion of the International Search Authority dated Jun. 19, 2017 of corresponding International application No. PCT/EP2017/054774; 16 pgs.

Chinese Office Action dated Oct. 31, 2019, in connection with corresponding CN Application No. 201780019117.6 (12 pgs., including machine-generated English translation).

Office Action dated Mar. 18, 2021 in corresponding Chinese Application No. 201780019117.6; 12 pages including English-language translation.

* cited by examiner

CONNECTION ASSEMBLY

FIELD

The invention relates to a connection assembly and a method for securing a connection assembly to at least one device.

BACKGROUND

Two devices, which are designed for example as batteries, can be joined together by way of a connection assembly designed as a module connector, the two devices usually being mechanically and/or electrically joined together. For this, the connection assembly is secured to the two devices, such a mounting needing to be carried out with slight effort. However, care must be taken here that the devices are not damaged during the mounting.

SUMMARY

Against this background, a connection assembly and a method are proposed with the features of the independent patent claims. Embodiments of the connection assembly and the method will emerge from the dependent patent claims and the description.

The connection assembly according to the invention, which can be called a module connector, for example, comprises at least one receiving module for receiving at least one securing element. The at least one receiving module comprises a chamber for receiving a securing element. The chamber is delimited by an inner wall and has a first opening as well as a second opening, wherein the two openings delimit a passage channel within the chamber. The chamber is enclosed by an inner wall that has at least one latching module to which the securing element is to be latched within the chamber at least temporarily and/or momentarily. Moreover, the latched securing element is to be arranged and/or received completely within the chamber.

The at least one receiving module is designed to receive a securing element which comprises a pin and a head that are joined together, wherein the passage channel is longer in the longitudinal direction, i.e., the inserting direction of the securing element in the receiving module, than the head and the pin that are joined together, and thus it is longer than the securing element. In this case, the pin is longer than the head, while a maximum external dimension of the head is larger than a maximum external dimension of the pin. In the event that the head has a round circular shape in cross section, i.e., perpendicular to the inserting direction of the head in the receiving module, the maximum external dimension corresponds to a maximum diameter of the round circular cross section of the head. The same applies to the pin, if the latter has a round circular shape in cross section. Also in this case the maximum external dimension then corresponds to a maximum diameter of the round circular cross section of the pin. Usually the pin and the head have a common axis of rotation. In configuration, the at least one receiving module is designed to receive a securing element that is designed as a screw, whose pin has a thread.

As a rule, a maximum internal dimension, for example, a maximum diameter in the case of a round circular cross section relative to the inserting direction, of the inner wall of the chamber is larger than the maximum external dimension of the head of the securing element. The at least one latching module delimits and/or encloses a region inside the chamber, whereby a minimum internal dimension, such as a minimum diameter, of the region of the inner wall of the chamber that is delimited and/or enclosed by the at least one latching module is smaller than the maximum external dimension of the head and larger than the maximum external dimension of the pin.

Furthermore, it is possible for the inner wall of the chamber of the at least one receiving module to be configured with rotational symmetry, such as cylindrically shaped, relative to the inserting direction of the securing element, whereby the at least one latching module has two bulges that are situated with an axial offset relative to each other, i.e., an offset along the longitudinal axis or axis of rotation, on the inner wall of the chamber. The two bulges are designed as constrictions and thus as components of the inner wall of the chamber. A minimum internal dimension, e.g., a minimum diameter of each one of these bulges in the case of a round circular shape of the bulges, is smaller than the maximum external dimension of the head of the securing element. A region of the inner wall situated between the two bulges has a minimum internal dimension, such as a minimum diameter, which is larger than the maximum external dimension of the head. This region of the inner wall is formed, for example, with cylindrical symmetry or as a round circular bead between the two bulges. An axial length of the region between the bulges is greater than a height or axial length of the head, so that the head is to be arranged between the two bulges, i.e., by clamping and/or latching.

Furthermore, an internal dimension, or, in the case of a circular round shape of the hole, a diameter of a first one of the two openings of the passage channel, for example, a first opening, is larger than the external dimension of the head, and an internal dimension, such as a diameter, of the other of the two openings of the passage channel is smaller than the external dimension of the head. The respective internal dimension of the openings is always larger than the maximum external dimension of the pin. Hence, it is possible to guide the pin through the second opening. On the other hand, the head should be placed and/or arranged inside the chamber on the second opening.

In configuration, a bearing element is arranged at the second of the two openings, this element having a hole with an internal dimension, or, in the case of a circular round shape of the hole, a diameter, which is smaller than the external dimension of the head and which delimits the second opening.

The connection assembly is to be secured to at least one device in the form of a battery. Generally two batteries are to be connected mechanically and/or electrically conductively to the connection assembly or the module connector. In this case, it is possible for individual receiving modules and/or bearing elements connected to them to be made of metal and to be electrically conductive. Furthermore, at least two receiving modules are interconnected in electrically conductive manner. Moreover, it is provided that the securing elements are also made of metal and are electrically conductive. It is possible for two receiving modules to be joined together by way of a connection body. The connection assembly in one embodiment has an insulation that is arranged on an outer wall of the connection assembly.

In configuration, two devices that are designed, for example, as batteries are to be joined together by way of the connection assembly. For this purpose, a first receiving module, in whose chamber a first securing element is latched and completely received, is associated with a first device, whereby the second opening of the chamber of the first receiving module is arranged at or on an opening of the first device. A second receiving module in whose chamber a second securing element is latched and completely received is associated with a second device, whereby the second opening of the chamber of the second receiving module is arranged at or on an opening of the second device.

After this, the head of the first securing element and hence also the first securing element is pushed by way of the first opening of the chamber of the first receiving module in the direction of the second opening, wherein the head initially latched with the latching module is unlatched and thus the first securing element is released. After this, the pin of the first securing element is pushed through the second opening of the first receiving module into the opening of the first device and secured therein, for example by screwing together. However, the head lies against the second opening of the first receiving module, which is delimited, for example, by the hole of the bearing element, and remains in the chamber. Correspondingly, the head of the second securing element and hence also the second securing element is pushed via the first opening of the chamber of the second receiving module in the direction of the second opening, wherein the head initially latched with the latching module is unlatched and thus the second securing element is released. After this, the pin of the second securing element is pushed through the second opening of the second receiving module into the opening of the second device and secured therein, for example, by screwing together. However, the head lies against the second opening of the second receiving module, which is delimited, for example, by the hole of the bearing element, and remains in the chamber.

In this case, the first device is to be connected by the first securing element to the first receiving module, and the second device is to be connected by the second securing element to the second receiving module. Since the two receiving modules are joined together by a connection body, the two devices, such as batteries, are to be joined together mechanically and electrically conductively by components of the connection assembly, i.e., the two securing elements, the two receiving modules, and the connection body.

In possible configuration, the connection assembly has at least one chamber, which is enclosed by the inner wall and comprises the first opening as well as the second opening, wherein the at least one chamber is designed for the receiving of a screw as a securing element having the head and the pin or bolt, whereby the wall has two bulges on one inner side, enclosing or axially delimiting a round circular groove on the inner wall, wherein the internal dimension, such as an internal diameter or minimum diameter of each one of the two bulges is smaller than the external dimension, for example, an external diameter or maximum diameter of the head, whereby an internal diameter of a groove base or bottom of the groove is at least as large as the external dimension of the head, whereby at least one of the two bulges has a distance from one of the two openings, for example, the second opening, which is greater than a length of the pin, whereby the head of the screw is to be clamped between the two bulges and the screw is to be received completely inside the chamber.

In the case of the method according to the invention for securing a connection assembly to at least one device, a connection assembly is used that has at least one receiving module for receiving a securing element, wherein each receiving module comprises a chamber for receiving a respective securing element, this chamber being delimited by an inner wall and has a first opening as well as a second opening, wherein the two openings delimit a passage channel within the chamber. The chamber is enclosed by an inner wall and has at least one latching module. The securing element is latched within the chamber at least temporarily and/or momentarily, the securing element latched therein being arranged and/or received completely within the chamber. The connection assembly is arranged on the at least one device, wherein the securing element is pushed out from the chamber of the at least one receiving module and is arranged on the at least one device and/or connected to the at least one device.

Furthermore, the connection assembly is secured to the at least one device by at least one securing element.

In configuration, at least one securing element is used that has a pin and a head, wherein the maximum external dimension of the head is larger than the maximum external dimension of the pin. The first opening of the passage channel has an internal dimension that is greater than the external dimension of the head. The second opening of the passage channel has an internal dimension that is smaller than the external dimension of the head. In configuration, a bearing element with a hole is thereby arranged at the second opening, this hole delimiting and/or forming the second opening. The securing element is introduced with the pin facing forward into the first opening, wherein, through the first opening, the head is situated in the chamber and is latched therein by the at least one latching module. The connection assembly is arranged on the at least one device, wherein the head is pushed, for example, by a tool through the first opening in the direction of the second opening and unlatched from the at least one latching module, wherein, through the second opening, the pin is connected to the at least one device. In this process, the head comes to bear against the second opening, usually the hole of the bearing element, inside the chamber and remains in the chamber, while the connection assembly is secured by the at least one securing element on the at least one device.

The connection assembly, which can also be designed as a module connector, is provided in configuration as a bus bar insulation for several devices designed as batteries. In this case, the connection assembly is generally to be secured to the devices by several securing elements. Pins of the securing elements are thereby anchored on the devices. Each device has for this purpose at least one opening to receive a pin of a securing element. If a securing element comprises a pin with a thread, the latter is to be screwed by the thread into a mating thread of such an opening, and such a securing of a connection assembly on a device is also known as a screw fixation. Furthermore, two such devices are to be joined together by way of a connection assembly.

If, in addition to a mechanical connection, an electrical connection also needs to be provided with the connection assembly in the case of batteries, the connection assembly is also known as a power connector. In this case, the connection assembly comprises several receiving modules with correspondingly several screws. In this case, the connection assembly and the screws are designed as insulated and protected against accidental contact. This is made possible e.g. at screw locations that are accessible through the openings of a respective chamber by applying insulation and/or by an additional insulation involving a covering. It is also possible thereby to arrange securing elements in captive manner in the receiving modules for the connection of two devices by way of the connection assembly. This prevents the connection element, designed, for example, as a screw, from sticking out from the receiving module respectively provided therefor, and thus from contact surfaces of the connection assembly.

During the mounting process, the connection assembly is arranged perpendicular to a terminal area of the device and the screw as the securing element is introduced into a borehole provided for this purpose on the device, such as a threaded borehole, whereby the securing element is moved along the passage channel from the first opening in the direction of the second opening. An electrical contact between the device and the connection assembly is generally provided by the screw. Because the securing element usually designed as a screw is received entirely in the receiving module provided for this purpose, no damage occurs to a bearing surface of the device, such as a coated surface, when the connection assembly is arranged on the device.

It is generally possible to receive a respective securing element in a respective receiving module in a complete and captive manner on account of the temporary latching provided inside a chamber of the respective receiving module, the securing element arranged in the chamber being completely enclosed by the chamber.

A positioning, usually a latching of the securing element in the chamber of a respective receiving module is by form-fitting or force-locking.

Further benefits and embodiments of the invention will emerge from the description and the accompanying drawing.

It is understood that the aforementioned features and the ones to be discussed further below can be used not only in the respective indicated combination, but also in other combinations or standing alone, without leaving the scope of the present invention.

BRIEF DESCRIPTION OF THE DRAWINGS

The invention is represented schematically with the aid of an embodiment in the drawing and shall be described schematically and in detail with reference to the drawing.

DETAILED DESCRIPTION

Figure 1:
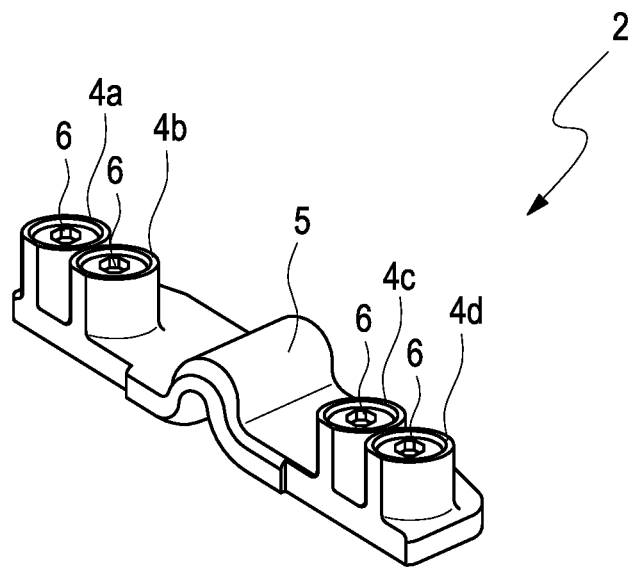
FIG. 1a shows in schematic representation an embodiment of the connection assembly according to the invention during the mounting of a device, from first perspective.
FIG. 1b shows in schematic representation an embodiment of the connection assembly according to the invention during the mounting of a device, from second perspective.
FIG. 1c shows in schematic representation an embodiment of the connection assembly according to the invention during the mounting of a device, from third perspective.
FIG. 1d shows in schematic representation an embodiment of the connection assembly according to the invention during the mounting of a device, from fourth perspective.
Figure 1:
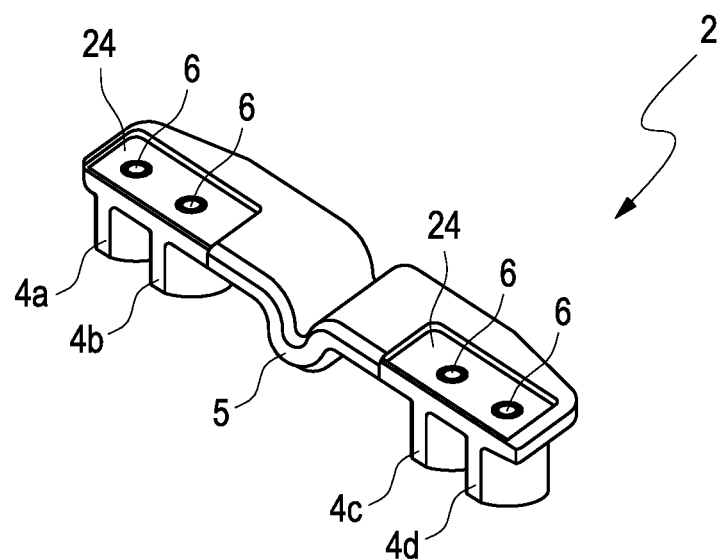

The embodiment of the connection assembly 2 according to the invention is represented schematically in FIG. 1a from above and in FIG. 1b from below. This connection assembly 2 comprises here four receiving modules 4a, 4b, 4c, 4d, each receiving module 4a, 4b, 4c, 4d being designed to receive a securing element 6, designed here as a screw. Each time, in this case, two receiving modules 4a, 4b, 4c, 4d are situated directly next to each other and form a respective pair of receiving modules 4a, 4b and 4c, 4d. The two pairs of receiving modules 4a, 4b and 4c, 4d are joined together by way of a connection body 5 of the connection assembly 2. The connection body 5 here comprises three sections, namely, two outer sections, between which is situated an inner or middle section. The two outer sections here are cuboidal and arranged parallel to each other as well as flush with each other in the same plane, a respective outer section having one pair of receiving modules 4a, 4b or 4c, 4d. The inner section arranged in between is bent and shaped as a semicircle in profile, the inner section enclosing a semicircular surface. Accordingly, the connection body 5 has a convex shape in the region of the inner section.

Figure 1D:
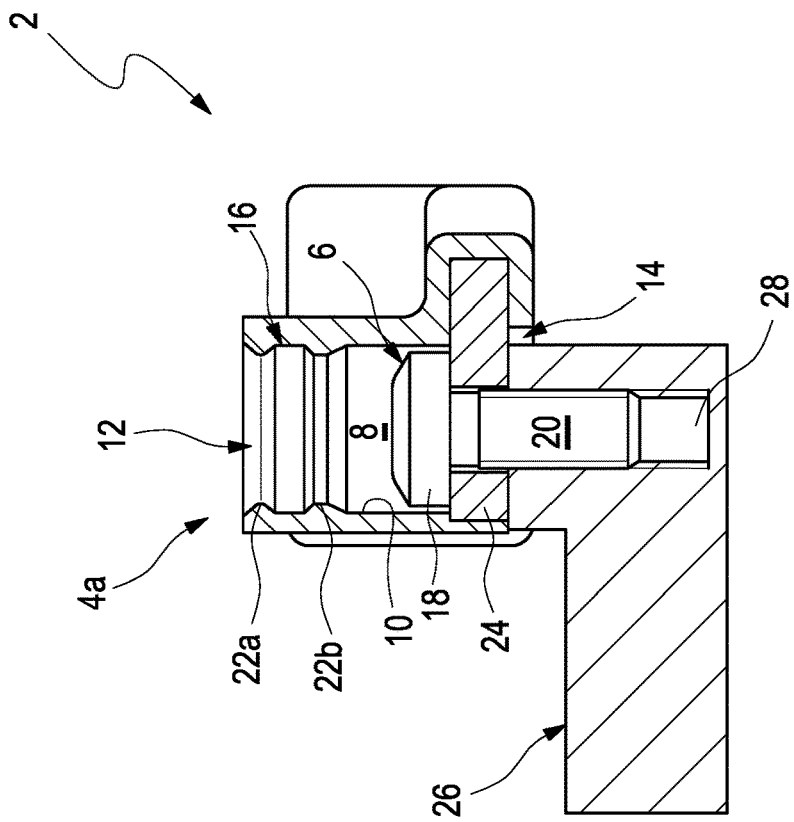
Figure 1C:
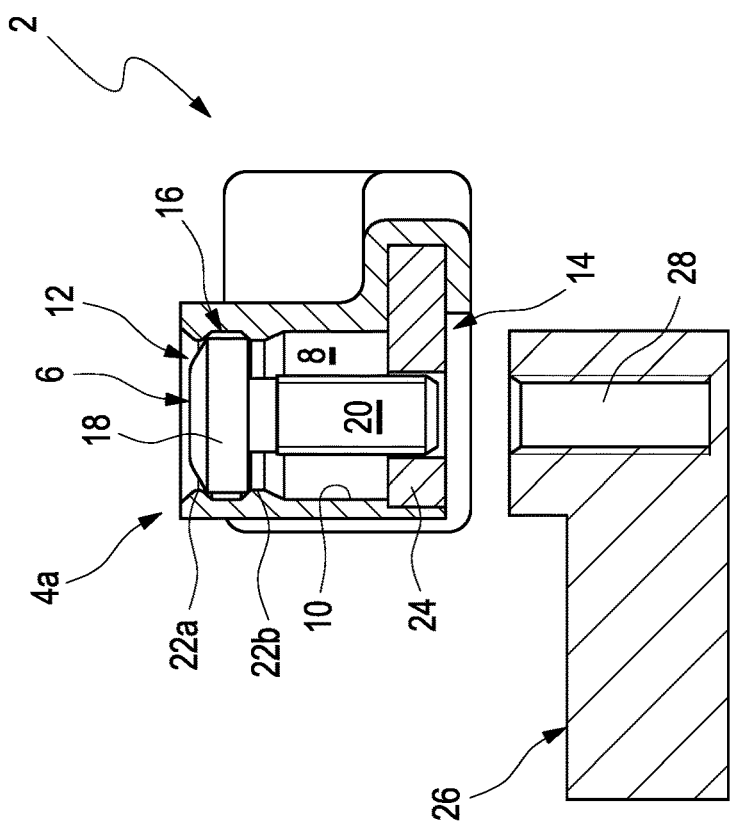

FIGS. 1c and 1d show a first receiving module 4a of the connection assembly 2 in a cross-sectional representation. In this case, the receiving module 4a comprises a chamber 8 with a rotationally symmetrical inner wall 10, a first opening 12, and a second opening 14. On the inner wall 10 is situated a latching module 16 for the temporary receiving of the securing element 6. It is provided here that a head 18 of the securing element 6 has a greater diameter and thus a greater external dimension than a pin 20 of the securing element 6. However, the pin 20 here is longer in the axial direction, i.e., in the inserting direction of the securing element 6 into the receiving module 4a, than the head 18 of the securing element 6. The latching module 16 here comprises two bulges 22a, 22b, which are arranged with a coaxial offset from each other along the inner wall 10 relative to the inserting direction of the securing element 6. The two bulges 22a, 22b have a minimum diameter or internal diameter and thus an internal dimension which is smaller than the maximum diameter or external diameter of the head 18. Between the two bulges 22a, 22b of the latching module 16 is situated a groove or a bead, while a groove bottom or groove base forms the inner wall 10 and has an internal diameter or minimum diameter as its internal dimension that is larger than the outer diameter of the head 18. Furthermore, an axial length of the groove base is greater than a height or axial length of the head 18. Accordingly, an axial spacing of the two bulges 22a, 22b is greater than a height of the head 18 of the securing element 6. Moreover, it is provided here that the second opening 14 is delimited here by a bearing element 24.

In order to provide the connection assembly 2, at first the securing element 6 is introduced by the pin 20 in front through the first opening 12 into the chamber 8 enclosed by the inner wall 10. If the head 18 is pressed against the first bulge 22a with a force whose value is at least as large as a limit value designed for this, the first bulge 22a is elastically deformed by the head 18. The head 18 of the securing element 6 is then clamped between the two bulges 22a, 22b of the latching module 16. The securing element 6 is received completely and in captive manner inside the chamber 8.

After this, the connection assembly 2 is arranged and/or placed on a device 26. Then the securing element 6 is pushed further through the first opening 12 in the direction of the device 26, and in this process is unlatched from the latching module 16 when the head 14 is pressed with a force, whose value is larger than the limit value, against the second bulge 22b. The pin 20 is then pushed through the second opening 14 in the direction of an opening 28 of the device 26, while the head 18 comes to bear against the bearing element 24. After this, the pin 20 is arranged in the opening 28, in the present embodiment, by being screwed together, whereby the device 26 and the connection assembly 2 are joined together by way of the securing element 6. In configuration, the pin 20 has a thread on the outside, which is screwed into a mating thread on an inner wall of the opening 28.

The invention claimed is:

1. A connection assembly comprising:
at least two pairs of receiving modules, each receiving module receiving a securing element, wherein the receiving module comprises a chamber for receiving the securing element, the chamber being delimited by an inner wall, and comprises a first opening as well as a second opening, wherein the first opening and the second opening delimit a passage channel within the chamber, wherein the inner wall has at least one latching module to which the securing element is to be latched within the chamber at least temporarily, after guiding the securing element along a longitudinal direction of the passage channel into the chamber through the first opening, wherein the latched securing element is to be received completely within the chamber;

a bearing element arranged at the second opening and extending between a pair of the at least two pairs of receiving modules;

a connection body joining the at least two pairs of receiving modules;

wherein the securing element includes a pin and a head which are joined together;

wherein one or more of the bearing element, the securing element, and the receiving module is electrically conductive;

wherein the connection assembly is to be secured to at least two devices, each device of the at least two devices being designed as a battery, by way of the securing element of one of the receiving modules being received in an opening provided on one device of the at least two devices and by way of the securing element of another of the receiving modules being received in an opening provided on another device of the at least two devices;

wherein an electrical connection is provided between the at least two devices by one or more of the securing element and the bearing element; and wherein the connection body includes at least two module sections and an intermediate section extending between the at least two module sections, each of the module sections having each pair of the at least two pairs of receiving modules, the intermediate section having a bent shape.

2. The connection assembly as claimed in claim 1, wherein the receiving module is designed to receive the securing element, wherein the passage channel is longer in an inserting direction of the securing element than the head and the pin.

3. The connection assembly as claimed in claim 2, wherein the receiving module is designed to receive the securing element that is designed as a screw.

4. The connection assembly as claimed in claim 2, wherein a minimum internal dimension of the inner wall of the chamber is greater than a maximum external dimension of the head of the securing element, wherein the at least one latching module delimits a region inside the chamber, wherein a minimum internal dimension of the region delimited by the at least one latching module is smaller than the maximum external dimension of the head and greater than a maximum external dimension of the pin.

5. The connection assembly as claimed in claim 4, wherein the inner wall of the chamber of the receiving module is designed with rotational symmetry relative to the inserting direction of the securing element, wherein the at least one latching module has two bulges that are situated with an axial offset relative to each other on the inner wall in an inserting direction of the securing element.

6. The connection assembly as claimed in claim 5, wherein:

at least one of the bulges includes at least one diagonal surface oriented diagonally to the inner wall of the chamber; and wherein, when the securing element is latched to the at least one latching module, the at least one diagonal surface is oriented facing the head of the securing element, and the head of the securing element abuts the at least one diagonal surface.

7. The connection assembly as claimed in claim 4, wherein an internal dimension of the first opening of the passage channel is larger than an external dimension of the head, and wherein an internal dimension of the second opening of the passage channel is smaller than the external dimension of the head.

8. The connection assembly as claimed in claim 7, wherein the bearing element has a hole with an internal dimension that is smaller than the external dimension of the head and that delimits the second opening.

9. The connection assembly of claim 1, wherein the connection body partially encloses the bearing element.

10. The connection assembly of claim 9, wherein:

the bearing element includes a first surface facing the head of the securing element and a second surface opposite the first surface facing each device of at least two devices; and a portion of the second surface is not enclosed by the connection body.

11. A method for securing a connection assembly to at least two devices, wherein the connection assembly has a connection body joining at least two pairs of receiving modules, each receiving module receiving a securing element, wherein the receiving module comprises a chamber for receiving the securing element, which is delimited by an inner wall and has a first opening as well as a second opening, wherein the first and the second opening delimit a passage channel within the chamber, wherein the chamber is enclosed by an inner wall that has at least one latching module, wherein the securing element is latched within the chamber at least temporarily, after guiding the securing element along a longitudinal direction of the passage channel into the chamber through the first opening, wherein the latched securing element is received completely within the chamber, wherein the connection assembly is arranged on the at least one device, wherein the securing element is pushed through the first opening in the direction of the second opening at least partially out from the chamber of the receiving module and is thereby secured to the at least one device;

wherein the securing element includes a pin and a head which are joined together;

wherein a bearing element is arranged at the second opening; and wherein one or more of the bearing element, the securing element, and the receiving module is electrically conductive;

wherein each device of the at least two devices is designed as a battery;

wherein the connection assembly is secured to each device of the at least two devices by way of the securing element of one of the receiving modules being received in an opening provided on one device of the at least two devices and by way of the securing element of another of the receiving modules being received in an opening provided on another device of the at least two devices;

wherein the bearing element extends between a pair of the at least two pairs of receiving modules;

wherein an electrical connection is provided between the at least two devices by one or more of the securing element and the bearing element; and wherein the connection body includes at least two module sections and an intermediate section extending between the at least two module sections, each of the module sections having each pair of the at least two pairs of receiving modules, the intermediate section having a bent shape.

12. The method as claimed in claim 11, wherein the at least one securing element is used, which has the head and the pin, wherein a maximum external dimension of the head is greater than a maximum external dimension of the pin, wherein the first opening of the passage channel has an internal dimension that is greater than an external dimension of the head, and wherein the second opening of the passage channel has an internal dimension that is smaller than the external dimension of the head, wherein the securing element is introduced by the pin facing forward into the first opening, wherein the head is situated through the first opening in the chamber and is latched by way of the at least one latching module, wherein the connection assembly is arranged on the at least one device, wherein the head is pushed through the first opening in the direction of the second opening, and is unlatched from the at least one latching module, wherein the pin is introduced through the second opening at least partially into the at least one device and is connected in this way to the at least one device, wherein the head comes to bear against the second opening inside the chamber and remains in the chamber, wherein the connection assembly is secured by way of the at least one securing element on the at least one device.

13. The method as claimed in claim 11, wherein:
the at least one latching module has two bulges that are situated with an axial offset relative to each other on the inner wall in an inserting direction of the securing element;
at least one of the bulges includes at least one diagonal surface oriented diagonally to the inner wall of the chamber; and
wherein, when the securing element is latched to the at least one latching module, the at least one diagonal surface is oriented facing the head of the securing element, and the head of the securing element abuts the at least one diagonal surface.

14. The method as claimed in claim 11, wherein the connection body partially encloses the bearing element.

15. The method as claimed in claim 14, wherein:
the bearing element includes a first surface facing the head of the securing element and a second surface opposite the first surface facing each device of at least two devices; and
a portion of the second surface is not enclosed by the connection body.

* * * * *